United States Patent [19]
Serafin et al.

[11] Patent Number: 6,051,327
[45] Date of Patent: Apr. 18, 2000

[54] NON-CORROSIVE METAL LAMINATED ON ALUMINUM

[75] Inventors: Daniel Serafin, Wexford; Paul B. Schultz, Export; Albert L. Askin; Donald J. Stanko, both of Lower Burrell, all of Pa.

[73] Assignee: Aluminum Company of America, Pittsburgh, Pa.

[21] Appl. No.: 08/992,834

[22] Filed: Dec. 17, 1997

[51] Int. Cl.[7] ............................. B32B 15/01; B32B 15/08
[52] U.S. Cl. ..................... 428/652; 148/531; 156/281; 156/324; 156/327; 156/330; 428/31; 428/416; 428/457; 428/458; 428/626; 428/653; 428/925; 428/926
[58] Field of Search ..................... 156/281, 324, 156/327, 330, 269; 428/652, 653, 416, 458, 31, 457, 626, 925, 926; 427/178, 207.1, 208.2; 148/531

[56] References Cited

U.S. PATENT DOCUMENTS

| | | | |
|---|---|---|---|
| 3,261,724 | 7/1966 | Ulam | 148/531 |
| 3,607,542 | 9/1971 | Leonard | 156/285 |
| 3,830,634 | 8/1974 | Zaremski et al. | 428/653 |
| 3,884,731 | 5/1975 | Barkman et al. | 148/531 |
| 4,877,657 | 10/1989 | Yaver | 428/31 |
| 4,992,323 | 2/1991 | Vogelesang et al. | 428/215 |
| 5,037,681 | 8/1991 | Yada et al. | 428/31 |
| 5,248,559 | 9/1993 | Okui et al. | 428/458 |

*Primary Examiner*—Deborah Jones
*Assistant Examiner*—Robert R. Koehler
*Attorney, Agent, or Firm*—Glenn E. Klepac; Douglas G. Glantz

[57] ABSTRACT

A non-corrosive metal on aluminum or aluminum alloy lamination is disclosed including a non-corrosive metal top sheet, an aluminum or aluminum alloy substrate, and an adhesive bonding the non-corrosive metal top sheet to the aluminum or aluminum alloy substrate to provide a non-corrosive metal on aluminum or aluminum alloy lamination product having lighter weight and less cost than a sheet product of the non-corrosive metal of identical thickness, wherein the lamination product withstands galvanic corrosion between the non-corrosive metal top sheet and the aluminum or aluminum alloy substrate. In one aspect, the non-corrosive metal top sheet is stainless steel. In one aspect, the non-corrosive metal top sheet is nickel or nickel alloy.

20 Claims, 5 Drawing Sheets

NON-CORROSIVE METAL LAMINATED ON ALUMINUM

BACKGROUND OF THE INVENTION

1. Technical Field

This invention relates to a laminated product such as a non-corrosive metal laminated on aluminum or aluminum alloy and a method of making such a laminated product. In one aspect, this invention relates to stainless steel laminated on aluminum or aluminum alloy and a method of making such a stainless steel lamination on aluminum or aluminum alloy.

2. Background

Stainless steel dominates in many markets as the material of choice because of its corrosion resistance.

However, stainless steel suffers from problems of high cost and heavy parts.

INTRODUCTION TO THE INVENTION

Aluminum is the preferred design choice for some metal applications because of light weight and lower cost than stainless steel. The light weight and lower cost of aluminum are attractive material properties that provide an enormous benefit to the manufacturer and especially to the end-user.

In replacing stainless steel in material design applications, aluminum can be bright rolled, or anodized, or coated. In some cases, the treated aluminum is as good as stainless steel in respect to corrosion resistance.

However, aluminum has a corrosion resistance which does not match up against certain non-corrosive metals, e.g., such as stainless steel in some applications. Aluminum's corrosion resistance sometimes discourages its use. Aluminum can be surface treated to provide excellent corrosion resistance, but, in some cases, existing surface treatments for aluminum do not provide the specific combination of formability, corrosion resistance, ultra-violet light resistance, scratch resistance, and ease of large-scale manufacture.

In the area of automotive trim, cost and light weight are critical factors. But, products achieving the required salt resistance, ultra-violet light resistance, scratch resistance, and formability at a reasonable cost have proven to be a challenging obstacle. Aluminum has a certain level of corrosion resistance, and the various available coatings cannot supply the scratch resistance and formability required. Further, the pre-treatments, brightening steps, and coating materials add an additional cost.

In areas other than automotive trim, aluminum replacement of stainless steel sometimes depends on corrosion resistance, but light weight and lower cost remain as attractive incentives.

A non-corrosive metal laminated on aluminum or aluminum alloy product and a method of making such a laminated product are needed in order to provide both the material properties of a non-corrosive metal top sheet, e.g., such as stainless steel, and the lighter weight and lower cost of aluminum.

It is an object of the present invention to provide a novel non-corrosive metal on aluminum or aluminum alloy laminated product and a method of making such a laminated product.

It is an object of the present invention to provide a novel non-corrosive metal on aluminum or aluminum alloy laminated product and a method of making such a laminated product having light weight.

It is an object of the present invention to provide a novel non-corrosive metal on aluminum or aluminum alloy laminated product and a method of making such a laminated product having lower cost.

It is an object of the present invention to provide a novel non-corrosive metal on aluminum or aluminum alloy laminated product and a method of making such a laminated product having corrosion resistance. It is an object of the present invention to provide a novel non-corrosive metal on aluminum or aluminum alloy laminated product and a method of making such a laminated product having excellent formability.

It is an object of the present invention to provide a novel non-corrosive metal on aluminum or aluminum alloy laminated product and a method of making such a laminated product having corrosion resistance in automotive applications.

These and other objects of the present invention will be described in the detailed description of the invention which follows. These and other objects of the present invention will become apparent to those skilled in the art from a careful review of the detailed description and by reference to the figures of the drawings.

SUMMARY OF THE INVENTION

The product and process of the present invention provide a non-corrosive metal on aluminum or aluminum alloy lamination including a non-corrosive metal top sheet, an aluminum or aluminum alloy substrate, and an adhesive bonding the non-corrosive metal top sheet to the aluminum or aluminum alloy substrate to provide a non-corrosive metal on aluminum or aluminum alloy lamination product having lighter weight and less cost than a sheet product of the non-corrosive metal of the same thickness as the lamination product, wherein the lamination product withstands galvanic corrosion between the non-corrosive metal top sheet and the aluminum or aluminum alloy substrate. In one aspect, the non-corrosive metal top sheet is stainless steel. In one aspect, the non-corrosive metal top sheet is nickel or a predominantly nickel alloy such as Inco's MONEL alloy.

DETAILED DESCRIPTION

The product and process of the present invention provide a thin gauge non-corrosive metal laminated to aluminum or aluminum alloy. The present invention provides a non-corrosive metal laminated on aluminum or aluminum alloy. The non-corrosive metal can be stainless steel. By non-corrosive metal, it is meant a metal with greater corrosion resistance than either aluminum or ordinary carbon steel in a particular environment of concern. Other non-corrosive metals also can be laminated to the aluminum or aluminum alloy substrate in the laminated product of the present invention. For example, nickel and nickel alloy foils are potential alternatives to the stainless steel laminated on the aluminum or aluminum alloy substrate.

An adhesive bonding is applied to fix the stainless steel foil on the aluminum or aluminum alloy substrate.

We have found that the non-corrosive metal laminated product of the present invention overcomes problems normally associated with two dissimilar metals and galvanic corrosion. One would have expected that aluminum, which is high in galvanic activity, and stainless steel, which is a passive material, would have created an electrical battery, in effect, and destructively acted on the aluminum.

Bi-metal fabrications, which are mechanically joined together, e.g., by rolling, suffer from problems of galvanic corrosion between the two dissimilar metals. Unlike bi-metal fabrications, the thin gauge non-corrosive metal on aluminum or aluminum alloy laminated product of the present invention incorporates an adhesive to glue the two metals together. The adhesive in the laminated product of the present invention is established in such a way as to act as an insulating barrier layer between the non-corrosive metal top sheet, e.g., of stainless steel and aluminum or aluminum alloy. The insulating barrier layer of the present invention contributes to a high corrosion resistance in the thin gauge non-corrosive metal laminated product of the present invention.

The laminated product of the present invention provides the corrosion resistance of stainless steel, in combination with the light weight and lower cost of aluminum.

We have found that the non-corrosive metal laminated product of the present invention provides unexpectedly favorable economics. The product of the present invention in certain lamination configurations versus stainless steel provides significant weight savings, e.g., 50% to 56% weight savings versus stainless steel. Accordingly, the product of the present invention is 20% lighter, preferably 50% lighter, than stainless steel. Significant cost savings also are provided for the 0.020 inch metal laminated product of the present invention. For metal laminated product of the present invention in the form of 0.25 inch plate, the weight and cost savings are significantly higher. The laminated product of the present invention replaces many products currently made from solid stainless steel.

Figure 1:
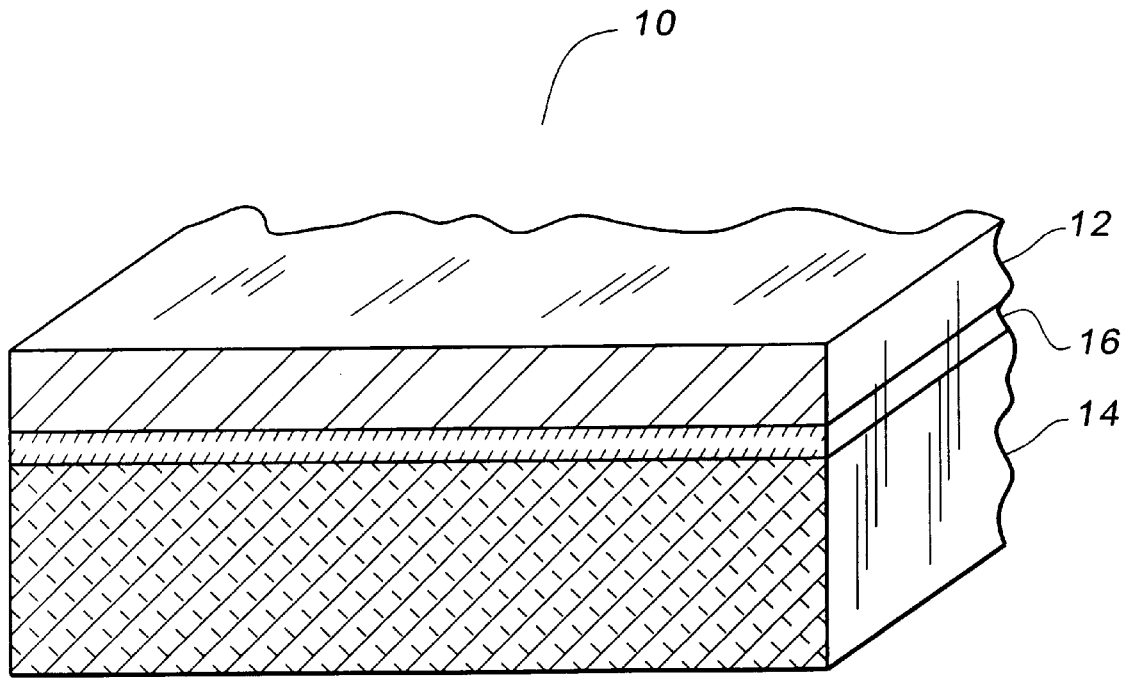
FIG. 1 is a perspective view of the thin gauge non-corrosive metal laminated to aluminum or aluminum alloy product of the present invention.

Referring now to FIG. 1, metal laminated product 10 is shown having non-corrosive metal top sheet 12 joined to aluminum or aluminum alloy metal substrate sheet 14 by insulating adhesive layer 16.

Aluminum substrate 14 of aluminum or aluminum alloy is at least 2 mils thick, more preferably about 10 mils or more thick. Non-corrosive metal top sheet 12 in one embodiment is stainless steel preferably of about 0.003 inches thick and larger. Below about 0.001 inches (1 mil) thick stainless steel, the laminated product of the present invention still may be fabricated, but the cost of the stainless steel increases significantly. Below about 0.002 inches (2 mils) thick stainless steel or non-corrosive metal top sheet, the metal becomes more susceptible to tearing, especially in continuous coil operations. Greater care in handling metal must be implemented as metal thickness decreases as a precaution against such tearing. Below about 0.002 inches (2 mils) thick stainless steel or non-corrosive metal top sheet, the laminate may read through, i.e., the top sheet may evidence scratches or ridges in the aluminum substrate, or the top sheet may evidence lumps or skips in the adhesive, as ridges and depressions in the stainless steel. At thinner stainless steel thicknesses, greater care must be taken to assure flat aluminum substrate and flat adhesive application.

Further, the stainless steel layer preferably is less than about 50%, more preferably less than about 25%, of the entire laminated metal composite thickness. At stainless steel layer thicknesses above about 25% of the entire laminated metal composite thickness, economics of the laminated product of the present invention are less attractive.

Non-corrosive metal top sheet 12 may be stainless steel, nickel, or nickel alloy.

Figure 2:
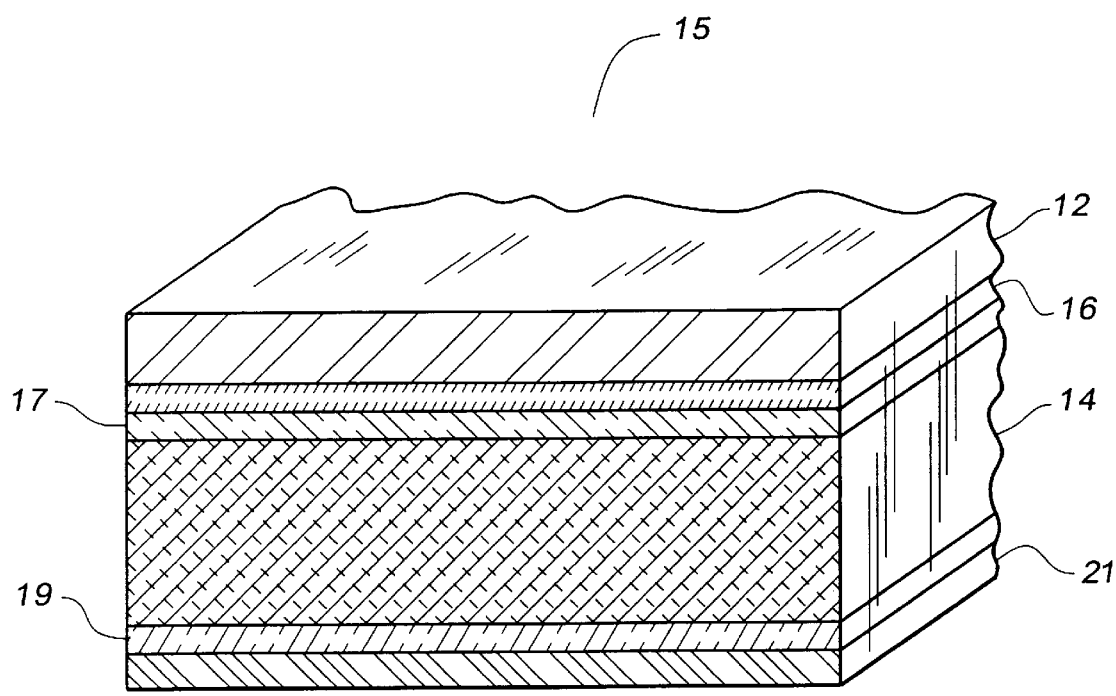
FIG. 2 is a perspective view of another embodiment of the thin gauge non-corrosive metal laminated to aluminum or aluminum alloy product of the present invention.

Referring now to FIG. 2, one side of the aluminum or aluminum alloy substrate 14 may have an adhesive layer 16 and the non-corrosive metal top sheet 12, with or without a conversion coating 17, and the other side of the aluminum or aluminum alloy substrate 14 may have the backer layer 21, with or without a conversion coating 19 between the substrate 14 and the backer 21.

Referring now to FIG. 2, metal laminated product 15 is shown having aluminum sheet 14 of aluminum or aluminum alloy having conversion coatings 17 and 19. Non-corrosive metal top sheet 12 is joined by insulating adhesive layer 16 to aluminum metal substrate sheet 14 having conversion coating 17. Aluminum substrate 14 of aluminum or aluminum alloy is shown at least 2 mils thick, more preferably about 10 mils or more thick.

In many applications, it may be desirable to add a conversion coating 17 and/or a conversion coating 19 to the aluminum or aluminum alloy substrate 14 before the adhesive 16 and the non-corrosive metal top sheet 12 are applied. The purpose of the conversion coating 17 or 19 is to enhance the corrosion resistance of the final product, and/or to improve the adhesion between the aluminum layer and the layers being applied to the aluminum. The conversion coat can be applied in an amount of about 5–30 mg./ft.$^2$. The disadvantage is added cost if greater corrosion resistance and adhesion are unnecessary. Conversion coating solutions can contain hexavalent chromium compounds and fluoride ion, among other components, but many environmentally friendly trivalent and non-chromium formulations can be used incorporating tungsten, vanadium, or molybdenum, in lieu of chromium.

In many applications, it may also be desirable to apply a backer layer 21 to the aluminum or aluminum alloy substrate 14 or conversion coating 19. This backer layer 21 will protect the side of the aluminum or aluminum alloy 14 without the non-corrosive metal top sheet to a limited degree. Such a backer layer may be a paint or varnish composed of polyurethane or polyesters. The backer coat layer 21 can be applied in an amount of 0.1–0.5 mil thickness.

In the process of the present invention for making the non-corrosive metal on aluminum or aluminum alloy laminated product of the present invention, the stainless steel foil is applied to a flat coiled aluminum or aluminum alloy substrate, then the unit is formed. Foil is unwound and pressed to flat material in a simple operation. No complex shaping of the foil needs to be involved. The present invention also includes flat non-coiled panels in a batch process.

Figures 3, 3A, 3B:
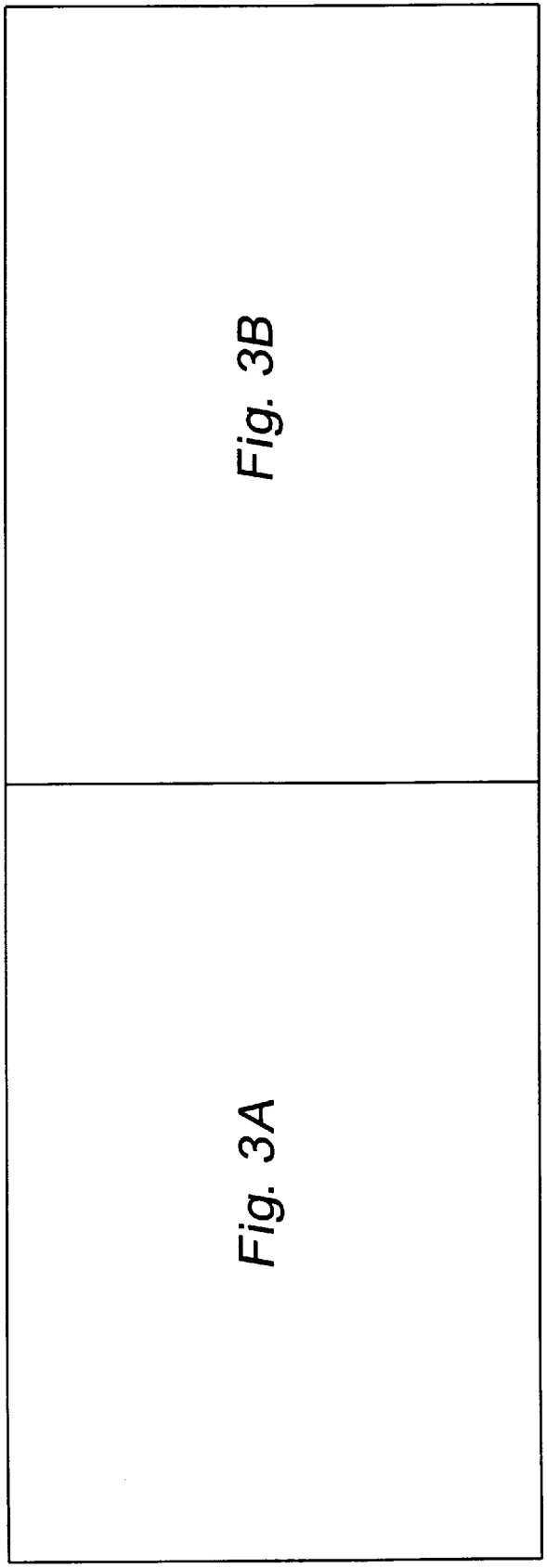
FIG. 3 shows FIG. 3A and FIG. 3B showing schematic depictions of the continuous process of the present invention for producing the thin gauge non-corrosive metal laminated to aluminum or aluminum alloy product of the present invention.
Figure 3A:
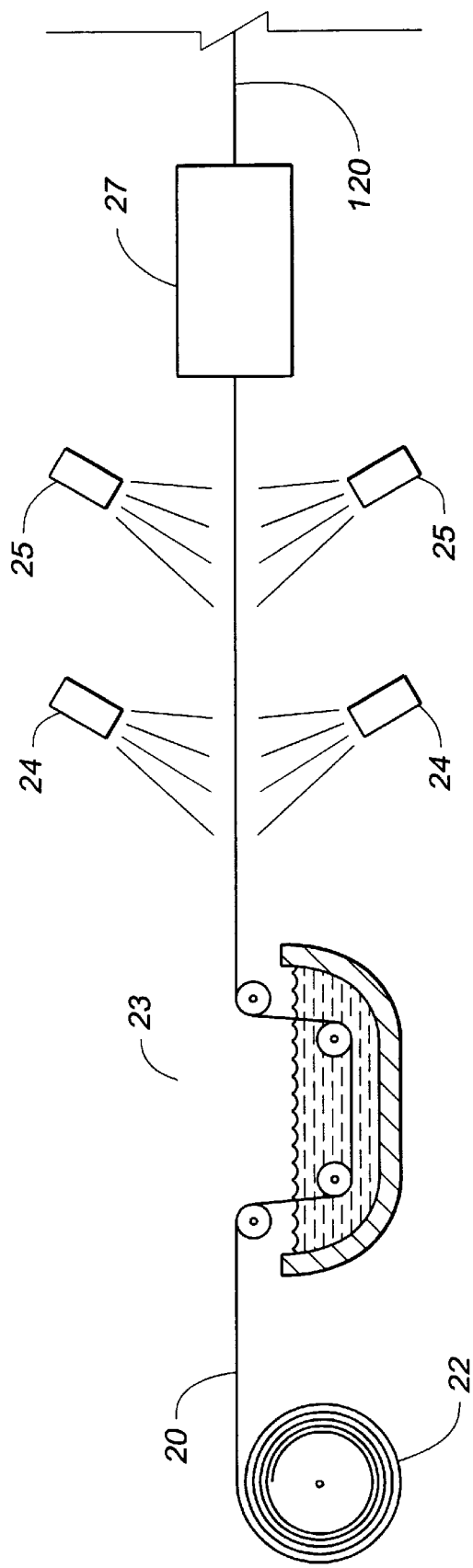
Figure 3B:
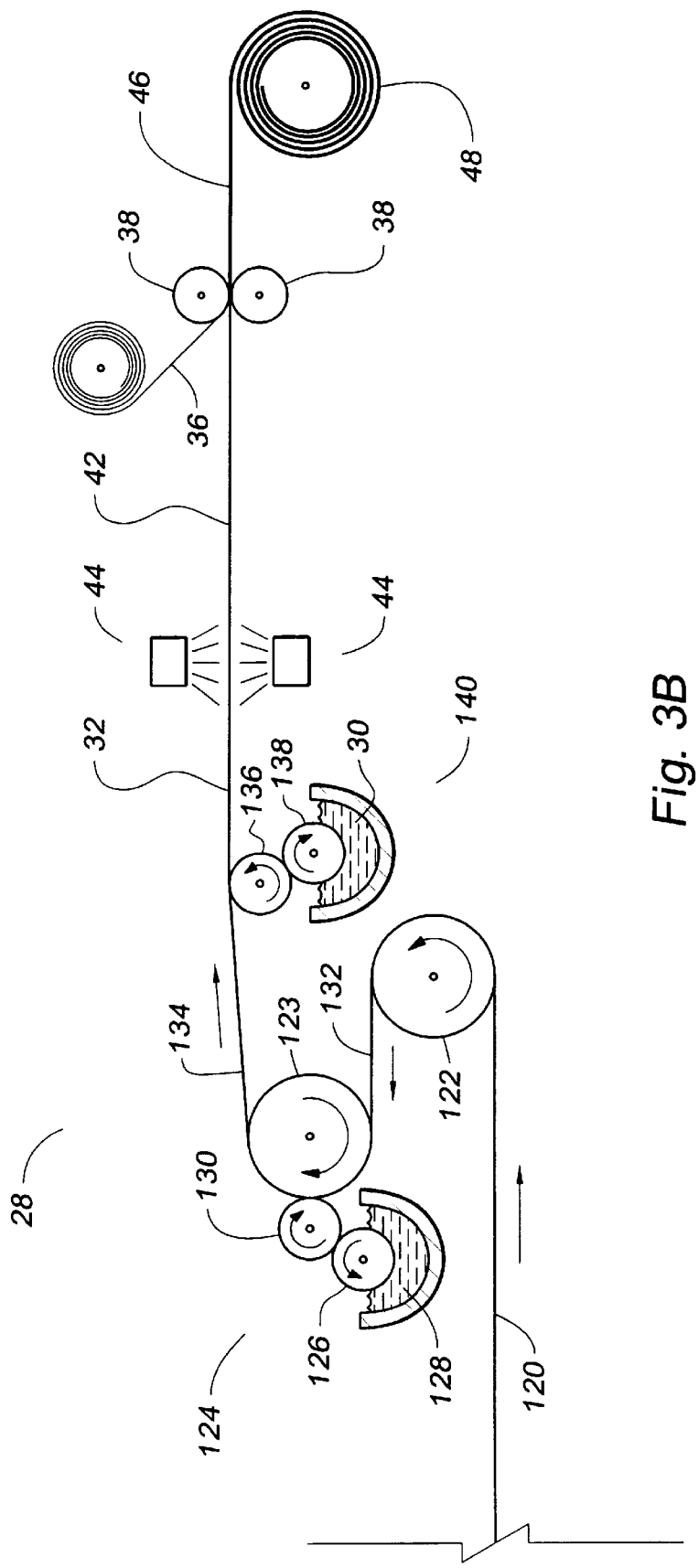

FIG. 3 shows FIG. 3A and FIG. 3B showing schematic depictions of the continuous process of the present invention for producing the thin gauge non-corrosive metal laminated to aluminum or aluminum alloy product of the present invention.

Referring now to FIG. 3A, a sheet 20 of aluminum or aluminum alloy from coil 22 is passed through a cleaning operation 23 and then is rinsed by spray rinsers 24 and dried by air dryers 25. Aluminum sheet 20 of aluminum or aluminum alloy preferably comprises an aluminum magnesium alloy of the AA5000 series.

The cleaned and dried aluminum or aluminum alloy sheet optionally is passed through a conversion coating operation, shown as box 27, for surface treatment to form sheet 120. The conversion coating operation 27 applies a conversion coating to the aluminum or aluminum alloy substrate, which conversion coating, in many applications, is desirable to add before the adhesive and before the non-corrosive metal top sheet are applied. The purpose of the conversion coating is to enhance the corrosion resistance of the final product, and/or to improve the adhesion between the aluminum or aluminum alloy layer and the layers being applied to the aluminum or aluminum alloy. If such a conversion coating is desired, the aluminum or aluminum alloy substrate, preferably cleaned but possibly uncleaned, is contacted with a conversion coating solution. Conversion coating solutions may contain hexavalent chromium compounds and fluoride ions, among other components, but alternatively may contain trivalent and non-chromium formulations using tungsten, vanadium, or molybdenum, instead of chromium. The conversion coating may be applied at 27 by spraying the conversion coating solution onto the aluminum or aluminum alloy substrate, immersing the aluminum or aluminum alloy substrate into a container of the conversion coating solution, or applying the conversion coating solution to the substrate with a roller. The substrate may or may not be rinsed after the conversion coating solution is applied, but generally must be dried before the adhesive is applied.

Referring now to FIG. 3B, the treated aluminum or aluminum alloy sheet 120 then is passed through an adhesive roll coater operation 28 to apply an adhesive 128. The aluminum or aluminum alloy sheet 120 is passed from left to right as indicated in FIG. 3B and enters an "S" wrap by passing around rotating roll 122 which changes web direction. At a tray operation 124, an adhesive 128 is gathered by a pick-up roll 126, which transfers the adhesive solution 128 to an applicator roll 130. The applicator roll 130 applies material to moving aluminum or aluminum alloy strip 132 rotating in opposite direction, e.g., such as by a reverse roll coater. Web direction changes again by passing around rotating roll 123. Moving aluminum or aluminum alloy strip 134 then passes in contact with an applicator roll 136 which applies backing coating 30 after receiving backing coating material from a pick up roll 138 to form adhesive coated and backing coated sheet 32. Adhesive roll coater operation 28 also can have a 3 roll set up, not shown, at each tray station 124 and 140.

It is possible to apply adhesive by other methods, such as by spraying, but roll application is considered often to be the best for a uniform thin coat.

Adhesive coated sheet 32 is cured in curing operation 44 to form adhesive cured sheet 42.

Adhesive cured sheet 42 then is bonded to a sheet 36 of non-corrosive metal by rolling sheets 42 and 36 through rollers 38. Rollers 38 press adhesive coated aluminum or aluminum alloy sheet 42 to bond to non-corrosive metal sheet 36 to form lamination 46 to provide the non-corrosive metal on aluminum or aluminum alloy laminated product 46 of the present invention which may be formed into coil 48. The non-corrosive metal sheet 36, e.g., such as stainless steel laminate sheet, is shown as coming down from the top because of easier access to the unwind roll and smoother application from the first roll which has a backer roll.

A non-corrosive metal sheet, e.g., such as stainless steel, may be applied to the opposite side of sheet 46, also, to form a non-corrosive metal sheet on each opposite sheet side of the aluminum or aluminum ally sheet.

Example I

Stainless steel or nickel foil samples 0.005 in. thick were laminated onto 0.020 gauge 5657 aluminum alloy. Some samples were laminated as received with no cleaning. Some samples were cleaned in alkaline non-etch cleaner and deoxidized. Some samples were cleaned and conversion coated. Two different adhesives were tried: Penguin 1086 and Terocal 4520. The Terocal 4520 was an epoxy adhesive made by the Terocal Corporation, since acquired by Parker+ Amchem and then by Henkel. The Penguin 1086 was also an epoxy, made by Sun Star Corporation.

All samples were sheared along all four edges to expose an aluminum/stainless or aluminum/nickel interface prior to exposure testing. Representatives of each combination of metal laminate and adhesive then were subjected to copper accelerated salt spray (CASS) for 44 hours and an Army/Navy humidity cabinet for 1000 hours.

CASS samples showed some staining of the stainless steel, most of which could be cleaned off with window cleaner.

No delamination or galvanic reaction was observed.

Army/Navy samples retained their original appearance, also with no delamination or galvanic reaction.

Although concerns in respect to adhesion in a wet environment and galvanic action had been considered to be potential major technical difficulties, no failure by galvanic action was observed.

Example II

Three different material foil samples, (1) 316 Stainless Steel, (2) 304 Stainless Steel, and (3) nickel, were obtained from Goodfellow Cambridge Limited of Cambridge, England.

The 316 Stainless Steel (316SS) was composed of Fe/Cr18/Ni10/Mo3 in a foil 0.05 mm thick. The 316SS foil had an annealed temper and came in a coil width of 300 mm.

The 304 Stainless Steel (304SS) was composed of Fe/Cr18/Ni10 in a foil 0.05 mm thick. The 304SS foil had a hard temper and came in a coil width of 200 mm.

The nickel was composed of 99.0% purity nickel in a foil 0.05 mm thick. The nickel had an annealed temper and came in a coil width of 300 mm.

The three different material foil samples were laminated onto 5657 aluminum alloy 0.020 inch gauge from the Aluminum Company of America master coil lot no. 721891 using a thin double backed adhesive tape 3M Double-backed Tape (Green release paper) from 3M Corporation and Ciba Geigy adhesive systems obtained from Ciba-Geigy of East Lansing Mich.: Araldite AV 8531, Araldite 2015/A,B, and Ciba Geigy 8595. Ciba Geigy Araldite AV 8531 is an epoxy adhesive. Ciba Geigy Araldite 2015/A is a toughened epoxy adhesive resin with Ciba Geigy Araldite 2015/B as the amine toughened adhesive hardener. Ciba Geigy 8595 is a 2 part adhesive system.

The samples laminated with tape were pressed in a platen press at 50 psi for 5 minutes at ambient temperature.

The Ciba-Geigy Araldite AV 8531 was cured at 140° F. for 60 minutes. The Ciba-Geigy Araldite 2015/A,B was cured at 159° F. for 35 minutes. The Ciba-Geigy 8595 was cured at 140° F. for 60 minutes.

Specimens were processed for the recommended period of time in the press with an attempt to control the bond-line at 3–5 mils through the use of shims. Multiple specimens, as limited by the platen size and the cure schedule, were run simultaneously. The tape specimens were put into the press for approximately 5 minutes to assure uniform contact over the entire area. All specimens were subjected to 50 psi for the duration of time in the press.

The samples laminated for roll forming trials were cut into 1.375 inch wide strips and laminated onto one continuous length of 1.375 inch 0.020 gauge roll-former stock which was cleaned and conversion coated in Alodine 401-45 solution for 30 seconds at ambient temperature.

The laminated continuous strip samples were roll formed and cut into individual samples and cleaned with methyl ethyl ketone and cheese cloth.

Samples were examined for confirmation of formability under actual manufacturing conditions.

Good adhesion was observed, and we have found the parts can be roll formed into specific profiles.

Example III

Stainless steel or nickel foil samples were laminated onto 5657 aluminum alloy. Parts remaining flat were scored with an X for salt spray tests. Some parts were formed in a roll former, and some of those were exposed to 1000 hours of continuous salt spray without a scored X. All parts had sealed edges. A summary of results follows in Table I, with salt spray time referring to time to corrosion.

TABLE I

| ADHESION TESTS | | | | | |
|---|---|---|---|---|---|
| Sample | Shape | Foil | Adhesive | Salt Spray Time | Adhesion |
| 497 | flat | 316SS | tape | 336 hrs | poor |
| 498 | flat | 316SS | 2015 | 336 hrs | good |
| 499 | flat | 316SS | 8531 | 336 hrs | good |
| 500 | flat | 304SS | tape | 1000 hrs+ | good |
| 501 | flat | 304SS | 2015 | 1000 hrs+ | good |
| 502 | flat | 304SS | 8531 | 1000 hrs+ | good |
| 503 | flat | Ni | tape | 336 hrs | good |
| 504 | flat | Ni | 2015 | 1000 hrs+ | good |
| 505 | flat | Ni | 8531 | 336 hrs | good |
| 506 | formed | 316SS | tape | 1000 hrs+ | poor |
| 507 | formed | 316SS | 2015 | 1000 hrs+ | fair |
| 508 | formed | 316SS | 8531 | 1000 hrs+ | fair |
| 509 | formed | 316SS | 8595 | 1000 hrs+ | fair |
| 510 | formed | 304SS | tape | 1000 hrs+ | poor |
| 511 | formed | 304SS | 2015 | 1000 hrs+ | fair |
| 512 | formed | 304SS | 8531 | 1000 hrs+ | fair |
| 513 | formed | 304SS | 8595 | 1000 hrs+ | fair |
| 514 | formed | Ni | tape | 1000 hrs+ | good |
| 515 | formed | Ni | 2015 | 1000 hrs+ | good |
| 516 | formed | Ni | 8531 | 1000 hrs+ | fair |
| 517 | formed | Ni | 8595 | 1000 hrs+ | good |

From the Example III and the Table I data, the 304 Stainless Steel laminated to aluminum may last longer in salt spray than 316 or nickel metal, perhaps because of less difference in the galvanic series between 304 and aluminum. The nickel metal may adhere better with the adhesives selected, and nickel metal may be the preferred overall selection. The concept of laminating a more inert metal to aluminum is technically viable with the proper selection of adhesive and metal.

Example IV

An aluminum of 5657 aluminum alloy was cleaned in Henkel A-31K alkaline non-etch aluminum cleaner. Conversion coating was not performed in this case. Adhesive was applied via a draw down bar in a standard laboratory method where coating or adhesive is rolled or smeared onto the surface of a sheet with a bar. The adhesive was applied in a production thickness of between about 0.5 and 1.0 mils. The adhesive was cured in an oven according to the procedure in the respective commercial supplier data sheets. Immediately upon removal from the oven, the adhesive coated aluminum sheet was placed into a "wringer" type roll setup along with the stainless steel sheet. The materials were forced together as the aluminum and stainless sheets proceeded between the 2 rolls.

After assembling, the samples were tested by the following procedure:

| | |
|---|---|
| 16 hours in a humidity cabinet | 100% humidity 100° F. |
| 2 hours in a freezer | −30° F. |
| 2 hours in open atmosphere | room temp. |
| 2 hours in an oven | 158° F |
| 2 hours in a salt spry chamber | ASTM test B-117 |

This was repeated for 30 cycles. Over weekends, parts were retained in the humidity cabinet.

Table II presents a summary of the adhesion testing versus adhesive type.

TABLE II

| ADHESIVE TESTS | | | |
|---|---|---|---|
| Adhesive | Type | Satisfactory Adhesion | |
| Penguin 1086 | Epoxy | No | |
| Terocal 4520 | Epoxy | No | |
| AdCote 1217D | Polyester | Yes | (catalyst) |
| AdCote 1145 | Polyester | Yes | (catalyst) |
| Upaco | Polyester | No | no catalyst |
| Adcote 1640 | Polyester | No | no catalyst |
| Adcote 56220 | Ionomer | No | |
| Mor-Ad M805 | Polypropylene | No | |

Polyesters having a co-reactant or catalyst were observed to produce preferred results. These adhesive tests were severe in nature and were intended to differentiate which adhesives which could handle severe conditions, e.g., for outer automotive trim used from Alaska to the equator. Other adhesives may be used for the product and process of the present invention in less severe final applications.

We have found unexpectedly favorable economics of the product and process of the present invention. The cost analysis provided in Table III for the product of the present invention compares certain lamination configurations versus stainless steel. Significant weight savings, e.g., 50% to 56% weight savings are provided. Significant cost savings also are provided. This analysis is provided for 0.020 inch metal. In a similar cost analysis for 0.25 inch plate, the weight and cost savings are significantly higher.

TABLE III

LAMINATED PRODUCT COST ANALYSIS

| Stainless Alloy | Aluminum Thickness | Stainless Thickness | Total Thickness | $/sq. ft. Aluminum | $/Pound Stainless | $/sq. ft. Stainless | $/sq. ft. Laminating | Total $/sq. ft |
|---|---|---|---|---|---|---|---|---|
| 304 | 0.017" | 0.003" | 0.020" | $0.37 | $4.69 | 0.59 | $0.25 | 1.21 |
| 304 | 0.015" | 0.005" | 0.020" | $0.33 | $4.01 | 0.84 | $0.25 | 1.42 |
| 304 | 0" | 0.020" | 0.020" | $0.00 | $1.63 | 1.36 | $0.00 | 1.36 |
| 316 | 0.017" | 0.003" | 0.020" | $0.37 | $6.55 | 0.82 | $0.25 | 1.47 |
| 316 | 0.015" | 0.005" | 0.020" | $0.33 | $5.60 | 1.17 | $0.25 | 1.75 |
| 316 | 0" | 0.020" | 0.020" | $0.00 | $2.28 | 1.90 | $0.00 | 1.90 |

| Stainless Alloy | Aluminum Thickness | Stainless Thickness | Total Thickness | Cost Difference | Weight Savings |
|---|---|---|---|---|---|
| 304 | 0.017" | 0.003" | 0.020" | −0.15 | 56% |
| 304 | 0.015" | 0.005" | 0.020" | 0.06 | 50% |
| 304 | 0" | 0.020" | 0.020" | | |
| 316 | 0.017" | 0.003" | 0.020" | −0.43 | 56% |
| 316 | 0.015" | 0.005" | 0.020" | −0.15 | 50% |
| 316 | 0" | 0.020" | 0.020" | | |

The Table III data includes the cost of the aluminum based on $1.55/lb rolled product.

The stainless steel costs for 316 0.005", 316 0.020" 304 0.003", and 304 0.005" are based on information provided May 6, 1997 by Brown Metals, Norman, Okla. for 24" wide coil. The 316 0.003" and 304 0.020" stainless costs are extrapolated from the above data.

Laminating cost estimate was based on 24" wide web, which is the widest width available from Brown Metals, Norman, Okla.

Weight savings do not take into account the influence of the adhesive used to bond the two metals together during lamination.

The stainless steel laminate on aluminum or aluminum alloy substrate of the present invention provides significant advantages over engineering plastic. Aluminum or aluminum alloy enables the part to retain all of the important material characteristics of metal. It is formable by roll forming or other techniques for coiled material. It is resistant to higher temperatures than most plastics. It is electrically conductive and can be welded.

Although the invention has been illustrated by the preceding detailed description, it is not intended to be construed as being limited to the specific preferred embodiments employed therein.

Whereas particular embodiments of the invention have been described herein above, for purposes of illustration, it will be evident to those skilled in the art that numerous variations of the details may be made without departing from the invention as defined in the appended claims.

What is claimed is:

1. A non-corrosive metal on aluminum lamination product, comprising:
   (a) a non-corrosive metal top sheet;
   (b) a structural member composed of an aluminum or aluminum alloy substrate; and
   (c) adhesive means consisting of a corrosion insulating adhesive barrier layer for bonding said non-corrosive metal top sheet to said aluminum or aluminum alloy substrate to provide a non-corrosive metal on aluminum or aluminum alloy lamination product having lighter weight and less cost than a sheet product of said non-corrosive metal of the same thickness as said lamination product, wherein said lamination product withstands galvanic corrosion between said non-corrosive metal top sheet and said aluminum or aluminum alloy substrate.

2. A lamination product as set forth in claim 1, wherein said non-corrosive metal comprises stainless steel.

3. A lamination product as set forth in claim 2, wherein said stainless steel top sheet has a thickness greater than about 0.002 inches.

4. A lamination product as set forth in claim 2, wherein said stainless steel top sheet has a thickness less than about 50% of the thickness of said lamination product.

5. A lamination product as set forth in claim 3, wherein said adhesive means comprises a two part epoxy adhesive.

6. A lamination product as set forth in claim 5 at least 20% lighter than stainless steel sheet product of identical thickness.

7. A lamination product as set forth in claim 1, wherein said non-corrosive metal comprises nickel or nickel alloy.

8. A lamination product as set forth in claim 7, wherein said top sheet has a thickness greater than about 0.002 inches.

9. A lamination product as set forth in claim 8, wherein said top sheet has a thickness less than about 50% of the thickness of said lamination product.

10. A lamination product as set forth in claim 1, wherein said lighter weight comprises at least 20% lighter in weight than a sheet product of nickel of the same thickness as said lamination product.

11. A lamination product as set forth in claim 10, wherein said adhesive means comprises a two part epoxy.

12. A lamination product as set forth in claim 1, further comprising a non-corrosive metal sheet and adhesive means for bonding said non-corrosive metal bottom sheet to said aluminum or aluminum alloy substrate.

13. A lamination product as set forth in claim 12, wherein said top sheet and said bottom sheet each comprises a thickness less than about 25% of the thickness of said lamination product.

14. A process for forming a non-corrosive metal on aluminum lamination product, comprising:
   (a) providing a non-corrosive metal top sheet;
   (b) providing a structural member composed of an aluminum or aluminum alloy substrate; and
   (c) providing a corrosion insulating adhesive barrier layer between said non-corrosive metal top sheet and said aluminum or aluminum alloy substrate by bonding said non-corrosive metal top sheet to said an aluminum or aluminum alloy substrate with an adhesive to provide a non-corrosive metal on aluminum or aluminum alloy lamination product having lighter weight and less cost than a sheet product of said non-corrosive metal of the same thickness as said lamination product, wherein said lamination product withstands galvanic corrosion between said non-corrosive metal top sheet and said aluminum or aluminum alloy substrate.

15. A process for forming a non-corrosive metal on aluminum lamination product as set forth in claim 14, further comprising providing said aluminum or aluminum alloy from a coil, passing said aluminum or aluminum alloy from a coil through a cleaning operation, then washing and drying the cleaned aluminum or aluminum alloy.

16. A process for forming a non-corrosive metal on aluminum lamination product as set forth in claim 15, further comprising passing said cleaned aluminum or aluminum alloy through a conversion coating operation for surface treatment.

17. A process for forming a non-corrosive metal on aluminum lamination product as set forth in claim 14, wherein said bonding said non-corrosive metal top sheet to said an aluminum or aluminum alloy substrate with an adhesive comprises passing a cleaned aluminum or aluminum alloy sheet through a roll coater to coat adhesive onto said sheet to form an adhesive coated aluminum or aluminum alloy sheet, curing said adhesive coated aluminum or aluminum alloy sheet to form an adhesive cured coated aluminum or aluminum alloy sheet, and rolling said adhesive cured coated aluminum or aluminum alloy sheet to form said non-corrosive metal on aluminum or aluminum alloy lamination product.

18. A process for forming a non-corrosive metal on aluminum lamination product, as set forth in claim 17, wherein said stainless steel top sheet has a thickness less than about 25% of the thickness of said lamination product.

19. A process for forming a non-corrosive metal on aluminum lamination product, as set forth in claim 17, wherein said non-corrosive metal on aluminum or aluminum alloy lamination product is at least 50% lighter than stainless steel sheet product of identical thickness.

20. A stainless steel on aluminum lamination product, comprising:
(a) a stainless steel top sheet having a thickness greater than about 0.003 inches;
(b) a structural member composed of an aluminum or aluminum alloy substrate; and
(c) an adhesive consisting of a corrosion insulating adhesive barrier layer bonding said stainless steel top sheet to said an aluminum or aluminum alloy substrate to provide a stainless steel on aluminum or aluminum alloy lamination product having at least 50% lighter weight and less cost than a sheet product of said stainless steel of identical thickness, wherein said lamination product withstands galvanic corrosion between said stainless steel top sheet and said aluminum or aluminum alloy substrate, and further wherein said stainless steel top sheet has a thickness less than about 25% of the thickness of said lamination product.

* * * * *